(12) United States Patent
Han

(10) Patent No.: US 6,764,053 B1
(45) Date of Patent: Jul. 20, 2004

(54) OBJECT HOLDER

(76) Inventor: Sam Han, 330 Bloombridge Way, Marietta, GA (US) 30066

( * ) Notice: Subject to any disclaimer, the term of this patent is extended or adjusted under 35 U.S.C. 154(b) by 0 days.

(21) Appl. No.: 10/368,543

(22) Filed: Feb. 18, 2003

(51) Int. Cl.[7] .................................................. A47K 1/08
(52) U.S. Cl. ..................................... 248/311.2; 248/313
(58) Field of Search .............................. 248/311.2, 313, 248/154, 316.5; 224/926; 220/737

(56) References Cited

U.S. PATENT DOCUMENTS

| | | | | |
|---|---|---|---|---|
| 1,761,497 A | * | 6/1930 | Smith | 224/222 |
| 2,743,893 A | * | 5/1956 | Johnston, Jr. | 248/146 |
| 2,750,140 A | * | 6/1956 | Smith | 248/154 |
| 3,301,512 A | * | 1/1967 | Nyberg | 248/524 |
| 4,963,440 A | * | 10/1990 | Shimogori et al. | 428/651 |
| 5,505,516 A | * | 4/1996 | Spykerman et al. | 248/311.2 |
| 5,572,776 A | * | 11/1996 | Murphy et al. | 24/543 |
| 5,791,618 A | * | 8/1998 | Lancaster | 248/311.2 |
| 6,637,082 B1 | * | 10/2003 | Chang | 24/523 |

FOREIGN PATENT DOCUMENTS

JP      405064775 A  *  3/1993

* cited by examiner

Primary Examiner—Korie Chan
(74) Attorney, Agent, or Firm—Thomas, Kayden, Horstemeyer & Risley

(57) ABSTRACT

A self-adjusting holder is described. The object holder comprises a frame and a plurality of arms pivotally attached to the frame. The arms have a lower member and an upper member, which are connected to each other at an angle.

16 Claims, 6 Drawing Sheets

OBJECT HOLDER

FIELD OF DISCLOSURE

The present disclosure relates generally to apparatuses for holding objects and, more particularly, to adjustable object holders.

BACKGROUND

Cup holders in cars are typically configured to hold cups that are within a given range of sizes. However, conventional cup holders are sometimes the wrong size for a given cup. Thus, drinks are often spilled due to the mismatch between cup sizes and cup-holder sizes. In view of this deficiency, it is desirable to have a different type of cup holder.

SUMMARY

The present disclosure provides apparatuses for holding objects and methods for holding objects.

Briefly described, in architecture, one embodiment of the apparatus comprises a frame having sides and arms. Each arm comprises an upper member and a lower member.

The lower member is connected to the upper member at an angle. The lower member of each arm is pivotally attached to one of the sides of the frame to permit pivoting of the arms about the frame.

The present disclosure also provides methods for holding objects.

In this regard, one embodiment of the method comprises the steps of receiving an object and pivoting a plurality of arms about a frame in response to receiving the object. At least one of the plurality of arms is configured to contact the object in response to the pivoting of the plurality of arms.

Other apparatuses, methods, features, and advantages will be or become apparent to one with skill in the art upon examination of the following drawings and detailed description. It is intended that all such additional apparatuses, methods, features, and advantages be included within this description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1A:
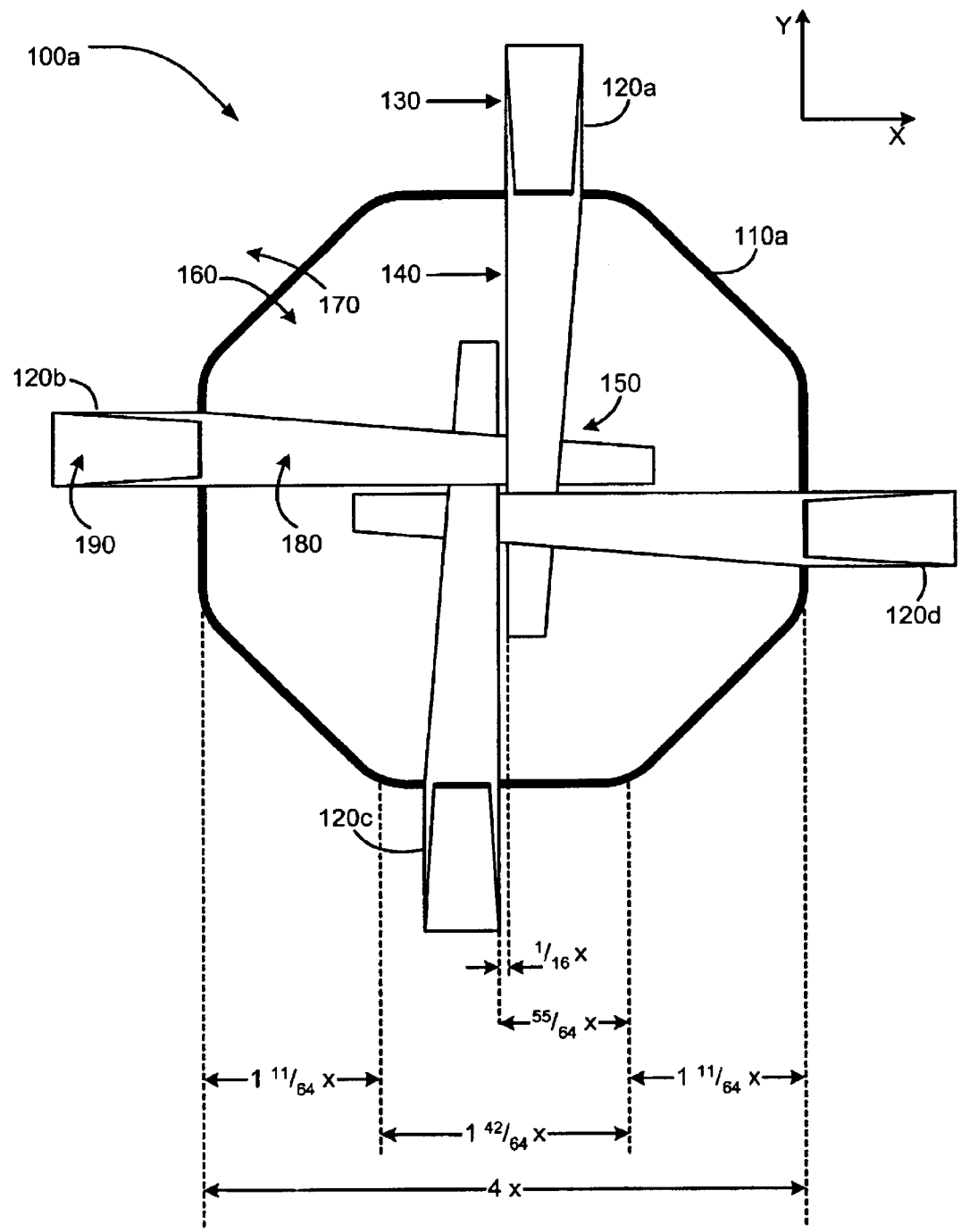
FIGS. 1A and 1B are diagrams showing top views of example object holders having pivoting arms attached to frames.

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents.

Figure 1B:
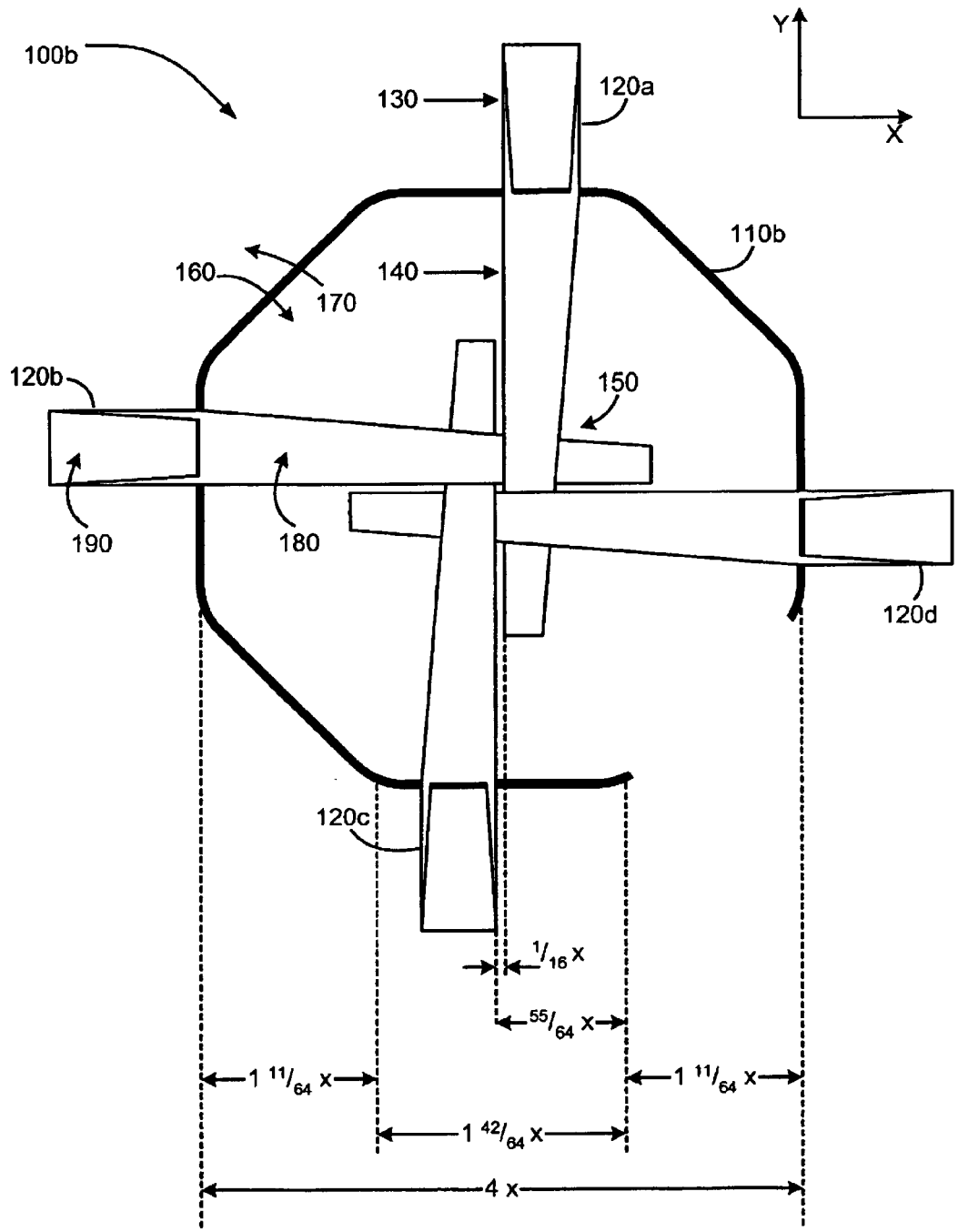

FIGS. 1A and 1B are diagrams showing top views of example object holders 100*a*, 100*b* having pivoting arms 120*a* . . . 120*d* attached to frames 110*a*, 110*b*. As shown in FIG. 1A, the object holder 100*a* comprises a frame 110*a* and a plurality of arms 120*a* . . . 120*d* (hereinafter simply referred to as "arm(s) 120"). The frame 100*a* is shaped as a substantially-symmetric, closed polygon having an inside 160 and an outside 170. Each of the arms 120 is pivotally attached to the frame 110*a* so that an outer portion 130 of the arm 120 is located outside 170 of the frame 110*a* while an inner portion 140 of the arm is located inside 160 of the frame 110*a*. If the net mass of the outer portion 130 of each arm is greater than the net mass of the inner portion 140 of each arm, then a natural downward gravitational force will result in a downward-outward movement of the outer portion 130 and an upward-inward movement of the inner portion 140 of the arm 120.

The arm 120 comprises an upper member 190 and a lower member 180, which are connected to each other at an angle. Embodiments of the arm 120 are shown in greater detail with reference to FIGS. 2 and 3A through 3C. The lower member 180 of the arm 120 is configured to pivotally attach to the frame 110*a*. In an example embodiment, a portion of the lower member 180 of each arm 120 is configured to overlap with a portion of the lower members 180 of adjacent arms 120 to form a "pinwheel" design 150 toward the center of the frame 110*a*. In this regard, if the net mass of the outer portion 130 is greater than the net mass of the inner portion 140 for each arm 120, then gravitational forces and will lock the arms 120 of the "pinwheel" design 150 together at substantially the center of the frame 110*a*. The "pinwheel" design 150, therefore, prevents full rotational movement of the arms 120 about the frame 110*a*. Additionally, if the net mass of the outer portion 130 is greater than the net mass of the inner portion 140, then, in the absence of any object in the object holder 100*a*, the object holder 100*a* will default to a position in which all of the inner portions 140 of the arms 120 are locked at substantially the center of the frame 110*a*.

Consequently, if a downward force is exerted on the inner portions 140 of the arms 120, then the resulting pivoting motion produces an upward-inward movement of the outer portions 130 of the arms 120. The upward-inward movement of the outer portions 130 of the arms 120 is used to secure the object in the object holder 100*a*. The movement of the arms 120 is shown in greater detail with reference to FIGS. 4A through 4D.

FIG. 1B shows another embodiment in which the frame 110*b* is not a closed polygon but, rather, an open polygon. In this regard, the frame 110*b* may be formed from a single wire that is formed into the open polygon pattern of FIG. 1B. As shown in FIGS. 1A and 1B, the frame may be many different shapes and sizes without deviating or detracting from the invention. In an example embodiment, the frame 110*a*, 110*b* is shaped as an equilateral octagon that displays both line and point symmetry. The arms 120 are pivotally attached off-center on each alternating side of the equilateral octagon. In other words, four arms 120 are attached to the frame 110*a*, 110*b* at every other side to form a four-legged "pinwheel" design 150. In one embodiment, the diameter of the frame 110*a*, 110*b* from one opposing side to another is approximately four inches, with each side being approximately 1 42/64 inches in length. The arms 120 located at each opposing side are separated from each other by a space of approximately 1/16 of an inch, thereby preventing any overlap between arms 120 that are attached to opposing sides. The arms 120 are pivotally attached to the frame 110*a*, 110*b* in such a manner that approximately ¼ (or approximately 25%) of the lower member 180 of the arm 120 is located outside 170 of the frame 110*a*, 110*b* while approximately ¾ (or approximately 75%) of the lower member 180 of the arm 120 is located on the inside 160 of the frame 110*a*, 110*b*.

Figure 2:
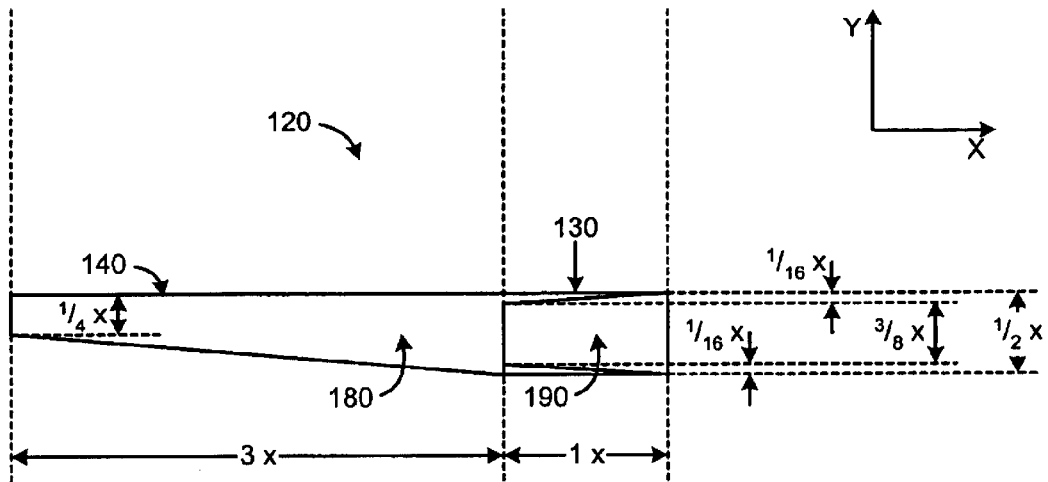
FIG. 2 is a diagram showing a top view of one embodiment of an arm that may be used for the object holder of FIG. 1A or 1B.

FIG. 2 is a diagram showing a top view of one embodiment of an arm 120 that may be used for the object holder 100*a*, 100*b* of FIG. 1A or 1B. As shown in FIG. 2, the arm 120 includes a lower member 180 and an upper member 190 that are attached to each other at an angle. Preferably, the arm 120 may be manufactured by injection-molding processes, machining processes, or other industrial processes suited for fabrication of mechanical components. The upper member 190, in conjunction with a portion of the lower member 180, define the outer portion 130 of the arm 120. The remaining portion of the lower member 180 of the arm 120 defines the inner portion 140 of the arm 120. In this regard, the outer portion 130 and inner portion 140 are delineated by a pivot point (shown with reference to FIGS. 3A through 3C) at which the arm 120 is attached to the frame 110*a*, 110*b*.

In an example embodiment, the arm 120 has a wider outer portion 130 and a narrower, tapered inner portion 140 to ensure that the net mass of the outer portion 130 is greater than the net mass of the inner portion 140. In this regard, the width of the narrower, tapered, inner portion 140 is approximately ¼ of an inch, while the width of the wider outer portion 130 is approximately ½ of an inch. The upper member 190 may also be tapered for aesthetic purposes. It should, however, be appreciated that the dimensions and shape of the arm 120 may be altered without adverse effect to the invention.

Figure 3A:
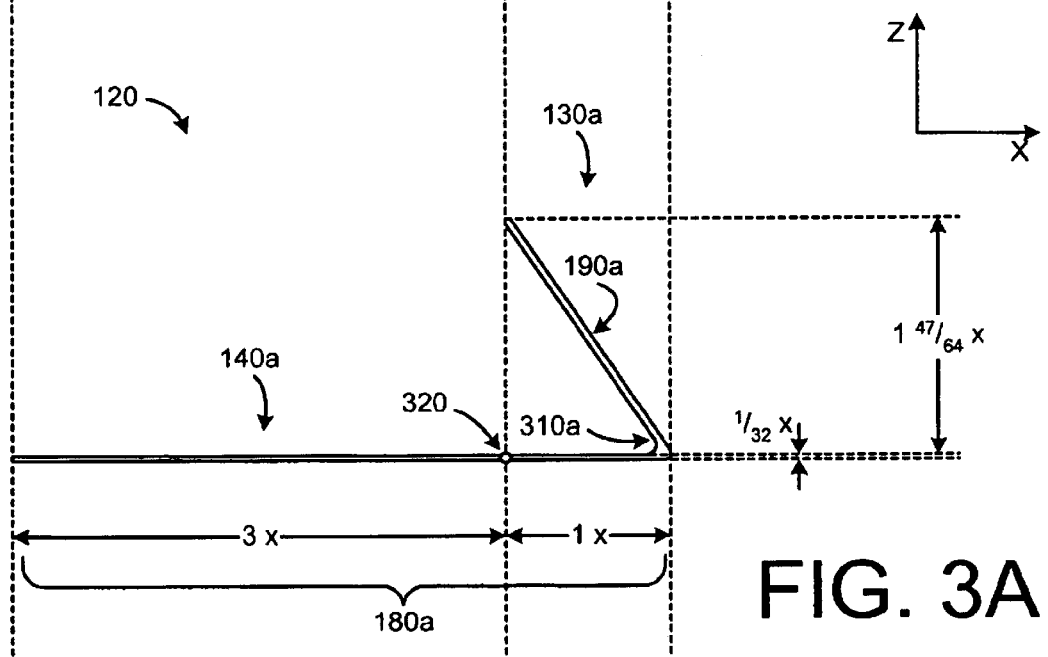
FIGS. 3A through 3C are diagrams showing side views of several embodiments of arms that may be used for the object holder of FIG. 1A or 1B.
Figure 3B:
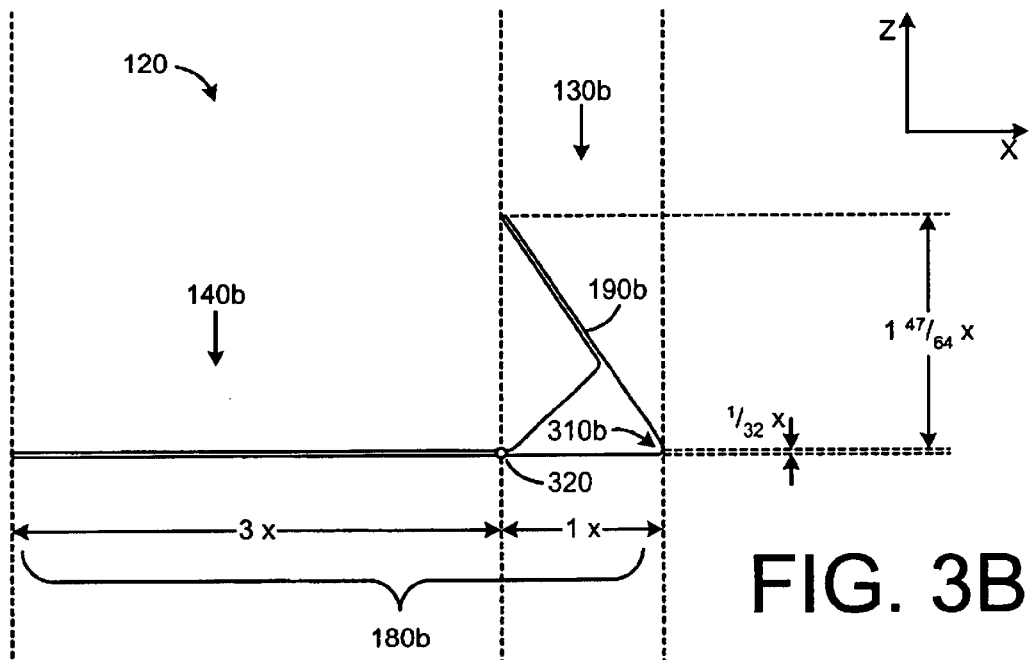
Figure 3C:
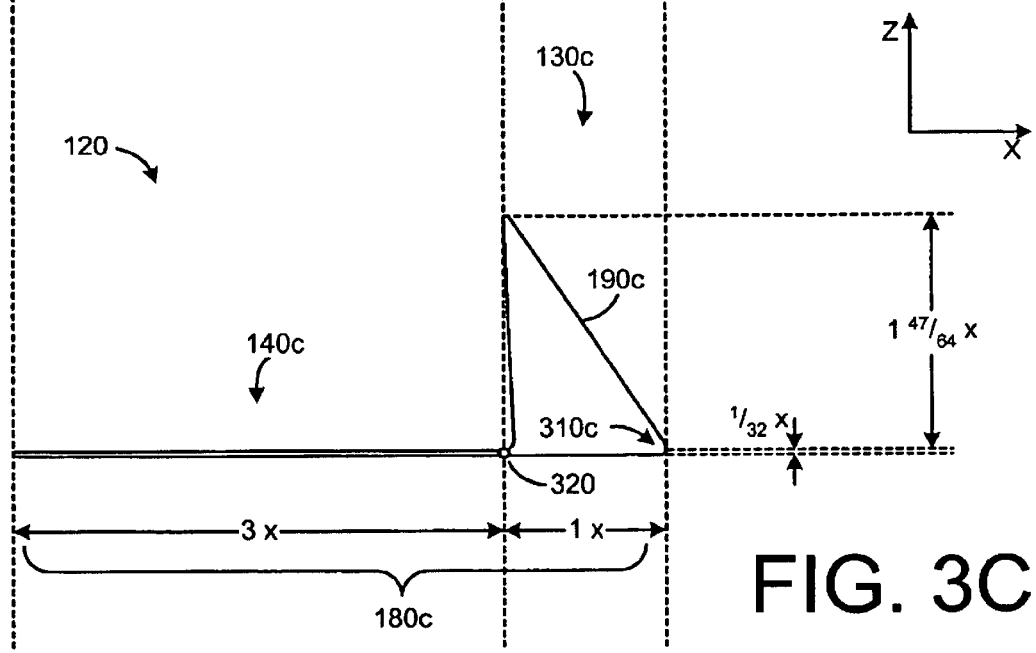

FIGS. 3A through 3C are diagrams showing side views of several embodiments of arms that may be used for the object holder of FIG. 1A or 1B. As shown in FIG. 3A, the arm 120 comprises a lower member 180*a*, an upper member 190*a*, and a pivot point 320. The upper member 190*a* and the lower member 180*a* are connected to each other at an angle 310*a*. In one embodiment, the angle 310*a* is approximately 60 degrees. However, it should be appreciated that the arm 120 of the object holder 100*a*, 100*b* may be designed such that the angle 310*a* between the upper member 190*a* and the lower member 180*a* is any angle less than 180 degrees, preferably between approximately 15 degrees and approximately 165 degrees, and more preferably between approximately 45 degrees and approximately 90 degrees.

The pivot point 320 is located on the lower member 180*a*, thereby defining an inner portion 140*a* of the arm 120 and an outer portion 130*a* of the arm 120. The pivot point 320 is the part of the arm 120 at which the arm 120 attaches to the frame 110*a*, 110*b*. In an example embodiment, the net mass of the outer portion 130*a* of the arm 120 is greater than the net mass of the inner portion 140*a* of the arm. Thus, for example, the lower member 180*a* of the arm 120 may be approximately four inches in length; the upper member 190*a* of the arm 120 may be approximately two inches in length; the angle 310*a* between the upper member 190*a* and the lower member 180*a* may be approximately 60 degrees, and the thickness of the arm 120 may be approximately 1/32 of an inch and substantially uniform throughout the arm 120. The pivot point 320 may be located approximately one inch from the angle 310*a* between the upper member 190*a* and the lower member 180*a*.

FIG. 3B shows another embodiment of the arm 120 in which the net mass of the outer portion 130*b* of the arm 120 is increased by adding more material to the portion of the arm 120 connecting the lower member 180*b* and the upper member 190*b*. As shown with reference to FIG. 3B, the added mass at the angle 310*b* results in a greater gravitational force on the outer portion 130*b* than the inner portion 140*b*.

FIG. 3C shows yet another embodiment of the arm 120 in which the net mass of the outer portion 130*b* of the arm 120 is increased by adding still more material. As shown by the embodiments of FIGS. 3A through 3C, the shape and mass distribution of the arms 120 may be custom tailored to suit a variety of needs. Consequently, the shape and dimensions of the arms 120 may be altered without adverse affect to the invention.

Figure 4A:
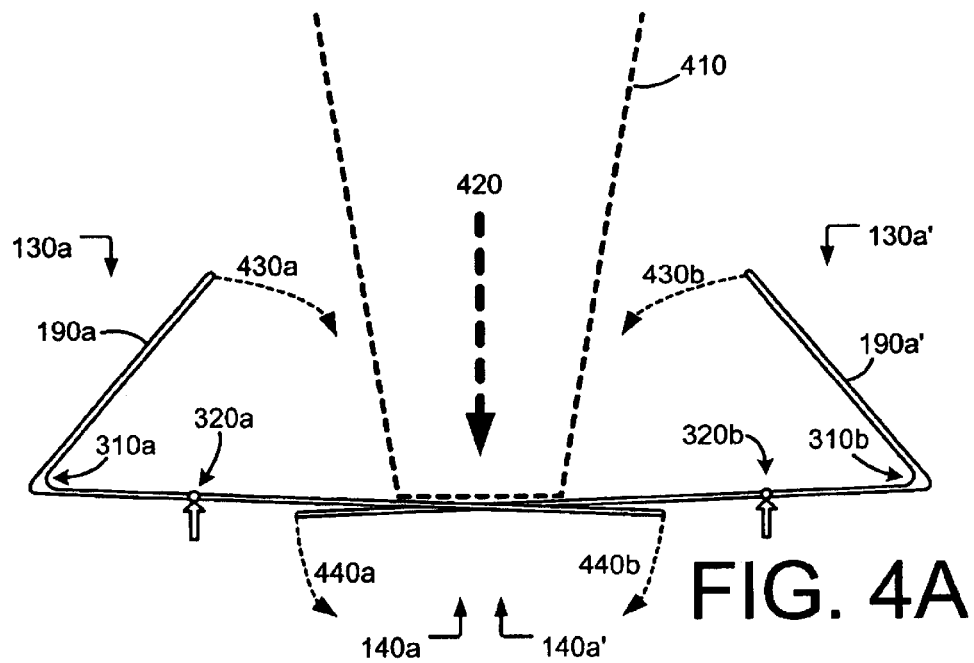
FIGS. 4A through 4D are diagrams illustrating the pivoting and securing mechanism of the object holder of FIG. 1A or 1B.
Figure 4B:
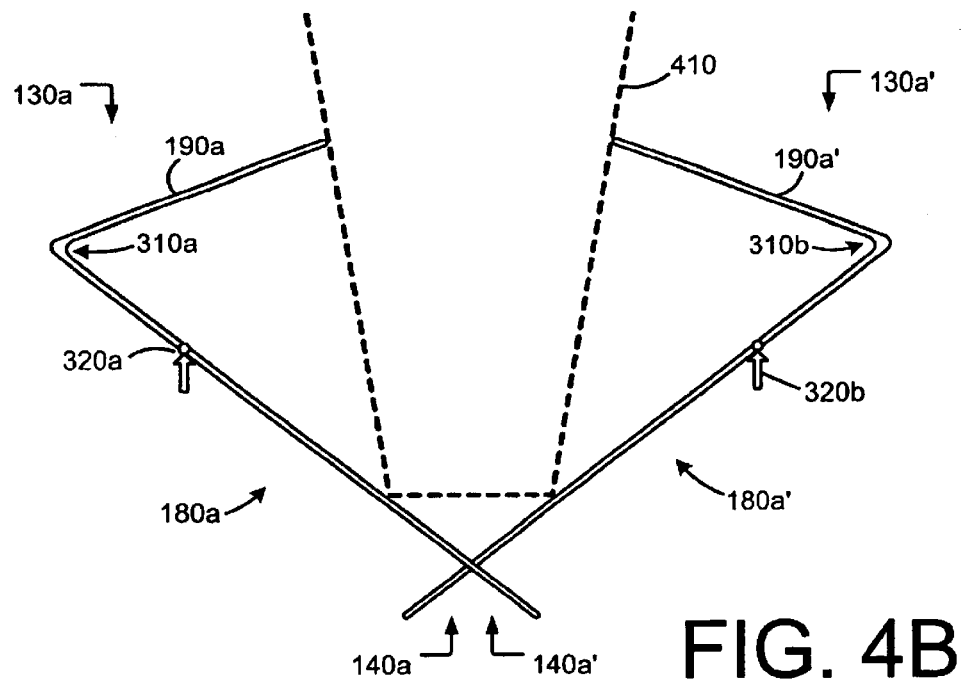
Figure 4C:
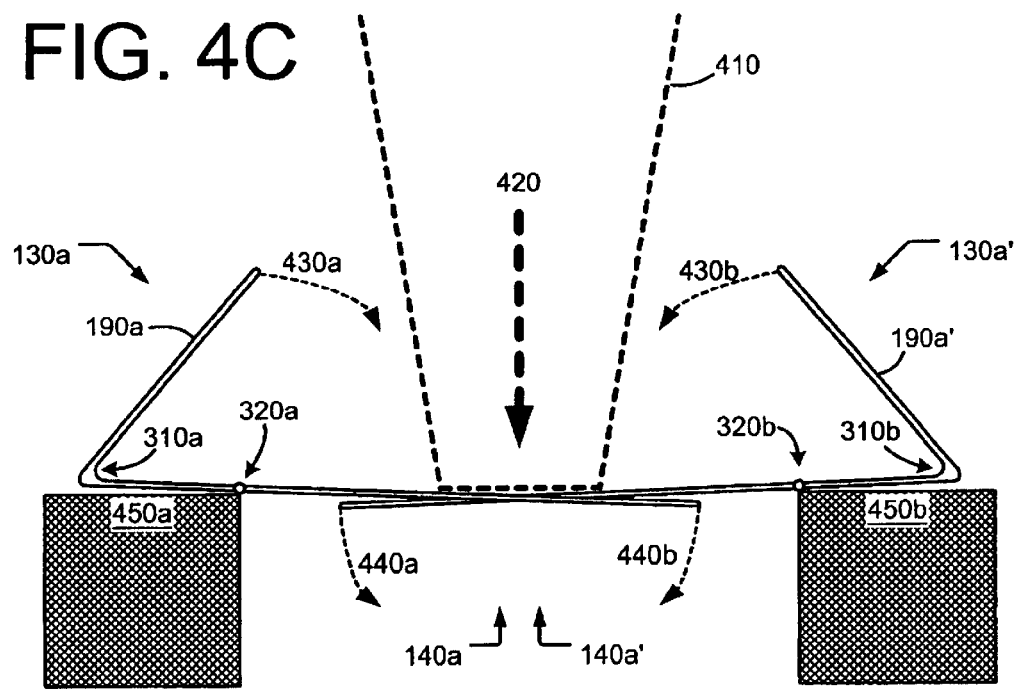
Figure 4D:
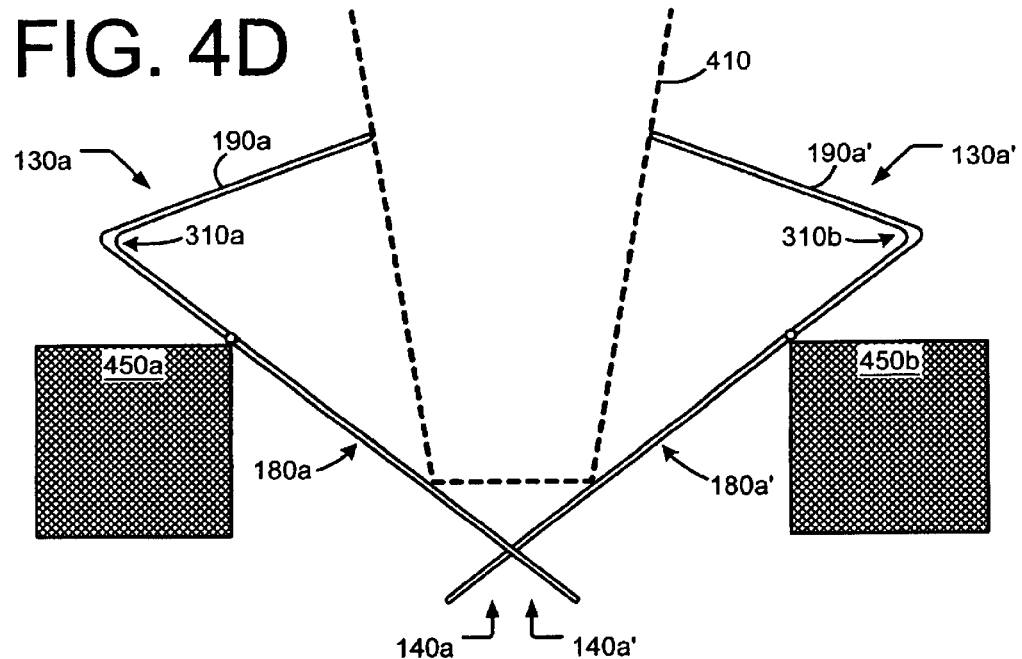

FIGS. 4A through 4D are diagrams illustrating the pivoting and securing mechanism of the object holder of FIG. 1A or 1B. FIGS. 4A and 4B show embodiments in which the arms 120 are pivotally attached to a wire frame, while FIGS. 4C and 4D show embodiments in which the arms 120 are pivotally attached to a solid, bulky frame (e.g., a plastic molding with a hole).

As shown in FIGS. 4A and 4B, the arms are pivotally attached by the pivot points 320*a*, 320*b*. In this regard, when an object 410 (e.g., a cup) is placed on the lower members of the arms as shown in FIG. 4A, the downward force 420 on the lower members of the arms results in a downward-outward movement 440*a*, 440*b* of the inner, lower members 180*a*, 180*a'*. Consequently, the downward force 420 also results in an inward movement 430*a*, 430*b* of the upper members 190*a*, 190*a'* of the arms. Eventually, the upper members 190*a*, 190*a'* make contact with the object 410 while the inner, lower members 180*a*, 180*a'* support the object 410 from the bottom of the object 410. When the object 410 is removed from the object holder, the movement is reversed due to the greater net mass at the outer portion 130 of the arm 120. As seen from FIGS. 4A and 4B, if the lower members 180*a*, 180*a'* of the arms 120 overlap sufficiently, then the upper members 190*a*, 190*a'* come together as the overlapping portions of the lower members 180*a*, 180*a'* decrease. In other words, the arms 120 may be configured so that, at any time during the pivoting moment, the upper members 190*a*, 190*a'* overlap and/or the lower members 180*a*, 180*a'* overlap. This type of configuration permits the holding of objects of almost any size.

FIGS. 4C and 4D show the arms being pivotally attached to solid articles 450*a*, 450*b*. In this regard, the movements 430*a*, 430*b*, 440*a*, 440*b* of the arms in FIGS. 4C and 4D are similar to the movements 430*a*, 430*b*, 440*a*, 440*b* of the arms in FIGS. 4A and 4B.

It should be appreciated that, due to configuration of the solid articles 450*a*, 450*b*, the arms 120 in FIGS. 4C and 4D need not form a "pinwheel" design in order for the object holder to maintain a fixed default position. Rather, the outer portion of the arms may simply rest on the solid articles 450*a*, 450*b* when no object is placed in the object holder.

As shown in FIGS. 4A through 4D, if the dimensions of the upper member 190 and the lower member 180 are carefully chosen, then the object holder can hold objects of almost any size. Thus, if the object holder is configured to hold cups, then the cup holder can hold cups of varying sizes as long as the diameter of the cup is less than the diameter of the frame.

Although exemplary embodiments have been shown and described, it will be clear to those of ordinary skill in the art that a number of changes, modifications, or alterations to the invention as described may be made. For example, while an example object holder is shown with four arms, it should be appreciated that the object holder may comprise any number of arms. In fact, a single arm that is positioned opposite to a relatively secure surface may be used as to hold the object between the members of the arm and the secure surface. Additionally, while specific dimensions for the object holder are taught, it should be appreciated that changes to the dimensions of the object holder will not detract from the invention. Furthermore, while a specific "pinwheel" design 150 is used in FIGS. 1A and 1B, it should be appreciated that other mechanisms (e.g., springs, magnets, additional weights, etc.) may be used to secure the arms of the object holder in a default position when no objects are placed in the object holder. Additionally, while the polygon-shaped frames of FIGS. 1A and 1B are shown to be substantially symmetric, it should be appreciated that asymmetric or irregular designs may be adapted to hold objects. Additionally, while example embodiments show that the arms are located with a portion inside of the frame and a portion outside of the frame, it should be appreciated that, if the pivot point on the arm is located at the angle between the upper and lower members of the arm, the entire arm may be located substantially inside of the frame 110. All such changes, modifications, and alterations should therefore be seen as within the scope of the disclosure.

What is claimed is:

1. An apparatus for holding objects, the apparatus comprising:
   a frame having sides; and
   at least three arms, wherein each arm comprises:
      an upper member; and
      a lower member, the lower member being connected to the upper member at an angle, the lower member being pivotally attached to one of the sides of the frame to permit pivoting of the arm about the side of the frame, the arms being pivotally connected to the frame such that a substantial portion of an outer portion of each arm is located outside of the frame while an inner portion of each arm is located inside of the frame, the outer portion of each arm comprising a portion of the lower member, the outer portion of each arm further comprising the upper member, the inner portion of each arm comprising a remaining portion of the lower member, the inner portions of the arms overlapping in a pinwheel configuration such that the inner portion of one of the arms is weaved between the inner portion of adjacent arms.

2. The apparatus of claim 1, wherein the frame has a shape, the shape being a polygon, the polygon being substantially symmetric.

3. The apparatus of claim 2, wherein the polygon is a closed polygon.

4. The apparatus of claim 2, wherein the polygon is an open polygon.

5. The apparatus of claim 2, wherein the polygon displays point symmetry.

6. The apparatus of claim 2, wherein the polygon displays line symmetry.

7. The apparatus of claim 2, wherein the lower member is pivotally connected to one of the sides of the frame such that the upper member is substantially parallel to a direction in which the arm pivots.

8. The apparatus of claim 1, wherein each of the arms are configured to pivot about their respective sides of the frame when an object is placed on the inner portion of at least one of the arms.

9. The apparatus of claim 1, wherein the upper member of at least one of the arms is configured to make contact with an object when the object is placed on the inner portion of at least one of the arms.

10. The apparatus of claim 1, wherein the net mass of the outer portion of the arm is greater than the net mass of the inner portion of the arm.

11. The apparatus of claim 1, wherein the angle between the upper member and the lower member is less than approximately 180 degrees.

12. The apparatus of claim 1, wherein the angle between the upper member and the lower member is between approximately 15 degrees and approximately 165 degrees.

13. The apparatus of claim 1, wherein the angle between the upper member and the lower member is between approximately 45 degrees and approximately 90 degrees.

14. The apparatus of claim 1, wherein the arm is formed from a homogeneous material.

15. The apparatus of claim 14, wherein the arm is formed from the homogeneous material using an injection-molding process.

16. The apparatus of claim 14, wherein the arm is formed from the homogeneous material using a machining process.

* * * * *